US008179862B2

(12) United States Patent
Kelly et al.

(10) Patent No.: US 8,179,862 B2
(45) Date of Patent: May 15, 2012

(54) METHOD FOR PREVENTING CO-CHANNEL OPERATION WITH RADAR SYSTEMS

(75) Inventors: Robert P. Kelly, Lauderhill, FL (US);
Brian K. Smith, Wellington, FL (US);
Timothy J. Wilson, Rolling Meadows, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 808 days.

(21) Appl. No.: 11/866,075

(22) Filed: Oct. 2, 2007

(65) Prior Publication Data

US 2009/0086684 A1    Apr. 2, 2009

(51) Int. Cl.
*H04W 4/00* (2009.01)
*H04L 12/26* (2006.01)
*H04J 3/00* (2006.01)

(52) U.S. Cl. .................... 370/332; 370/252; 370/465

(58) Field of Classification Search .................. 370/310, 370/331, 332, 336, 328, 338, 442, 464, 465
See application file for complete search history.

(56) References Cited

U.S. PATENT DOCUMENTS

| | | | |
|---|---|---|---|
| 5,574,979 A | 11/1996 | West | |
| 6,006,071 A | 12/1999 | Roberts et al. | |
| 6,208,871 B1 * | 3/2001 | Hall et al. | 455/517 |
| 6,256,478 B1 | 7/2001 | Allen et al. | |
| 6,804,496 B1 | 10/2004 | Carlson et al. | |
| 6,804,542 B1 * | 10/2004 | Haartsen | 455/574 |
| 6,870,815 B2 | 3/2005 | McFarland | |
| 7,027,424 B1 | 4/2006 | Horvat et al. | |
| 7,143,320 B2 | 11/2006 | Cavin | |
| 7,436,803 B2 * | 10/2008 | Chae et al. | 370/331 |
| 7,813,371 B2 * | 10/2010 | McNew et al. | 370/431 |
| 2001/0009555 A1 | 7/2001 | Diepstraten et al. | |
| 2003/0126492 A1 | 7/2003 | Cavin | |
| 2004/0028003 A1 * | 2/2004 | Diener et al. | 370/319 |
| 2004/0151137 A1 * | 8/2004 | McFarland et al. | 370/329 |
| 2004/0203398 A1 | 10/2004 | Durrant | |
| 2005/0058151 A1 | 3/2005 | Yeh | |
| 2005/0128988 A1 * | 6/2005 | Simpson et al. | 370/338 |
| 2005/0157676 A1 | 7/2005 | Kwak et al. | |

(Continued)

FOREIGN PATENT DOCUMENTS

EP    1119153 A1    7/2001

(Continued)

OTHER PUBLICATIONS

"Regulation Keeps the Peace Between Communications, Navigation Systems" by Henry S. Kenyon, Signal Magazine (Dec. 2003).

(Continued)

*Primary Examiner* — Warner Wong (57) ABSTRACT

A method for preventing co-channel operation with a radar system includes the steps of setting a state of a first communication channel to active, connecting to a first wireless access point on the first communication channel, passively scanning at least a second communication channel for communication from a second wireless access point, setting a state of the second channel to active if frames are received on the second channel, determining whether an elapsed time since frames were received on at least one of the first channel and the second channel has exceed a predefined value, and in response to the predefined value being exceeded for at least one of the first channel and the second channel, setting the state of a corresponding one of the first channel and the second channel to passive.

14 Claims, 4 Drawing Sheets

U.S. PATENT DOCUMENTS

| | | | |
|---|---|---|---|
| 2005/0159109 A1 | 7/2005 | Kivekas et al. | |
| 2005/0243737 A1* | 11/2005 | Dooley et al. | 370/254 |
| 2005/0270218 A1 | 12/2005 | Chiodini | |
| 2006/0014496 A1 | 1/2006 | Klein | |
| 2006/0120333 A1 | 6/2006 | Horvat et al. | |
| 2006/0133543 A1 | 6/2006 | Linsky et al. | |
| 2006/0176827 A1 | 8/2006 | Lehew et al. | |
| 2006/0187869 A1* | 8/2006 | Czaja et al. | 370/320 |
| 2006/0286935 A1* | 12/2006 | Utsunomiya et al. | 455/63.1 |
| 2007/0032211 A1 | 2/2007 | Kopikare | |
| 2007/0126622 A1 | 6/2007 | Nallapureddy | |
| 2007/0207841 A1* | 9/2007 | Amerga et al. | 455/574 |
| 2007/0280332 A1 | 12/2007 | Srikanteswara et al. | |
| 2008/0069041 A1* | 3/2008 | Tandai et al. | 370/329 |
| 2008/0144550 A1 | 6/2008 | Makhlouf et al. | |
| 2008/0146155 A1 | 6/2008 | Makhlouf et al. | |
| 2008/0146156 A1 | 6/2008 | Makhlouf et al. | |
| 2008/0146172 A1 | 6/2008 | Makhlouf et al. | |
| 2009/0052382 A1* | 2/2009 | Stephenson et al. | 370/329 |

FOREIGN PATENT DOCUMENTS

| | | |
|---|---|---|
| EP | 0963051 B1 | 3/2005 |
| JP | 11-136743 A | 5/1999 |
| KR | 10-2007-0017899 | 2/2007 |
| WO | 95/27381 A1 | 2/1995 |
| WO | 01/65709 | 9/2001 |
| WO | 01/73956 A2 | 10/2001 |
| WO | 2004070988 A2 | 8/2004 |
| WO | 2005032053 A1 | 4/2005 |

OTHER PUBLICATIONS

ISR of PCT/US08/76956.

Allen Heberling"Draft Proposal for a Wireless Personal Area Network Medium Access Control and Physical Layer Protocol", Jan. 8, 1999, 1-16 pages. Doc.: IEEE 802.11-99/006.

Patent Cooperation Treaty, "PCT Search Report and Written Opinion of the International Searching Authority"for International Application No. PCT/US2007/086571 May 29, 2008, 14 pages.

United States Patent and Trademark Office, "Notice of Allowance and Fee(s) Due" for U.S. Appl. No. 11/611,725 dated Oct. 8, 2009, 12 pages.

Patent Cooperation Treaty, "PCT Search Report and Written Opinion of the International Searching Authority" for International Application No. PCT/US2007/086718 May 20, 2008, 11 pages.

United States Patent and Trademark Office, "Non-Final Office Action" for U.S. Appl. No. 11/611,732 dated Oct. 15, 2010, 9 pages.

Patent Cooperation Treaty, "PCT Search Report and Written Opinion of the International Searching Authority" for International Application No. PCT/US2007/086364 May 29, 2008, 14 pages.

United States Patent and Trademark Office, "Non-Final Office Action" for U.S. Appl. No. 11/611,718 dated Aug. 21, 2010, 11 pages.

Patent Cooperation Treaty, "PCT Search Report and Written Opinion of the International Searching Authority" for International Application No. PCT/US2007/086443 May 27, 2008, 14 pages.

Tourrilhes J. Ed - Institute of Electrical and Electronics Engineers, "Fragment Adaptive Reduction; Coping with Various Interferers in Radio Unlicensed Bands", 2001 IEEE International Conference on Communications, Jun. 11-14, 2001 , pp. 239-244, Vo.

United States Patent and Trademark Office, "Non-Final Office Action" for U.S. Appl. No. 11/611,337 dated Aug. 5, 2010, 19 pages.

* cited by examiner

METHOD FOR PREVENTING CO-CHANNEL OPERATION WITH RADAR SYSTEMS

FIELD OF THE INVENTION

This invention relates in general to radar channel avoidance, and more particularly, to systematically scanning available channels for radar activity and evacuating or avoiding channels containing the determined radar activity.

BACKGROUND OF THE INVENTION

The prevention of interference between civilian and government communication and navigation systems is a continuing challenge to operators of wireless systems. This problem becomes even more complex as the ability to "roam" across national boarders is becoming available in an increasing number of commercially available wireless devices and the networks on which they operate.

802.11 is a set of standards created by the Institute of Electrical and Electronics Engineers (IEEE), an international standards-setting group. The standards govern wireless networking transmission methods and have several versions, such as the well-known 802.11a, 802.11b, and 802.11g, which are used to provide wireless connectivity in the home, office, and some commercial establishments.

An amendment to the 802.11 standard, called 802.11h, prevents wireless networks from obstructing radar, Earth Exploration Satellite Service (EESS), and Space Research Service (SRS) transmission. The 802.11h amendment calls for, among other things, Wireless Local Area Networks (WLANs) and other devices to detect the presence of radar activity and to protect them from interference by avoiding operation on their communication channel or reducing transmission power. Although the IEEE 802.11h specification describes the requirement of radar avoidance, the standard does not resolve the issue of how avoidance is to be carried out. The design and implementation of a radar avoidance mechanism is left to the developers of an 802.11 network and/or devices.

Therefore, a need exists to prevent 802.11 stations from transmitting on channels where a radar system may be operating.

SUMMARY OF THE INVENTION

A device is disclosed for preventing co-channel operation with a radar system, and includes the steps of setting a state of a first communication channel to active, connecting to a first wireless access point on the first communication channel, passively scanning at least a second communication channel for communication from a second wireless access point, setting a state of the second channel to active if frames are received on the second channel, determining whether an elapsed time since frames were received on at least one of the first channel and the second channel has exceed a predefined value, and in response to the predefined value being exceeded for at least one of the first channel and the second channel, setting the state of a corresponding one of the first channel and the second channel to passive.

In accordance with a feature of the present invention, the method includes determining whether a signal quality value of at least one of the first channel and the second channel exceeds a predetermined minimum value and setting all communication modes to passive in response to determining that the signal quality value of the at least one of the first channel and the second channel does not exceed the predetermined minimum value.

In accordance with another feature of the present invention, the method includes in response to the predefined value not being exceeded for at least one of the first channel and the second channel, determining whether a signal quality value exceeds a predetermined minimum value.

In accordance with a further feature of the present invention, the method includes entering a low-power sleep mode for a predetermined amount of time in response to the signal quality not exceeding the predetermined minimum value and upon expiration of the predetermined amount of time, passively scanning at least a third communication channel for communication from a second wireless access point.

In accordance with yet another feature of the present invention, the method includes assigning a timestamp value in response to setting the state of the second channel to active.

In accordance with an additional feature of the present invention, a device for preventing co-channel operation with a radar system includes a timer, a transceiver operable to communicate on a plurality of channels to a plurality of access points, and a processor communicatively coupled to the processor and to the timer. The processor operable to set a state of a first communication channel to active, connect with the transceiver to a first wireless access point on the first communication channel, passively scan with the transceiver at least a second communication channel for communication from a second wireless access point, set a state of the second channel to active if frames are received on the second channel, determine with the timer whether an elapsed time since frames were received on at least one of the first channel and the second channel has exceed a predefined value, and in response to the predefined value being exceeded for at least one of the first channel and the second channel, setting the state of a corresponding one of the first channel and the second channel to passive.

BRIEF DESCRIPTION OF THE DRAWINGS

The accompanying figures, where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

The present invention provides a method and device that effectively scans available channels for AP activity (AP searching) without interfering with transmissions broadcast by a radar system.

The vast majority of populated areas of the world are now within coverage of some form of wireless network providing wireless communication services to subscribers located within that particular geographic area. The most popular of theses services is voice communication between a wireless mobile device and a second communication point, such as a second wireless device, or any other destination on the network.

The present invention can be utilized for situations in which a wireless device is within coverage of a non-carrier wireless network. Carrier networks, by comparison, operate on cellular networks or Wide Area Networks (WAN) and, generally, are controlled by cellular carriers including, but not limited to, AT&T, Sprint PCS, Metro PCS, Verizon Wireless, and T-Mobile Wireless. Carrier networks typically employ an analog-based air interface and/or one or more digital-based air interfaces. Digital-based air interfaces utilize digital communication technologies including, but not limited to, Code Division Multiple Access (CDMA), Time Division Multiple Access (TDMA), Global System for Mobile Communications (GSM), Wideband Code Division Multiple Access (WCDMA), Code Division Multiple Access-3rd Generation (CDMA2000), and the like.

Non-carrier networks operate on wireless networks and, generally, are not controlled by cellular carriers. Non-carrier networks employ a wireless local area network (WLAN) based air interface including, but not limited to, the IEEE 802.11 protocol.

Non-carrier networks are able to be coupled to other networks, such as the internet, through additional wired or wireless networking equipment. This coupling allows one to connect from a first network to one or more networks, of the same or different types, for a multi-network communication session.

System Diagram

Figure 1:
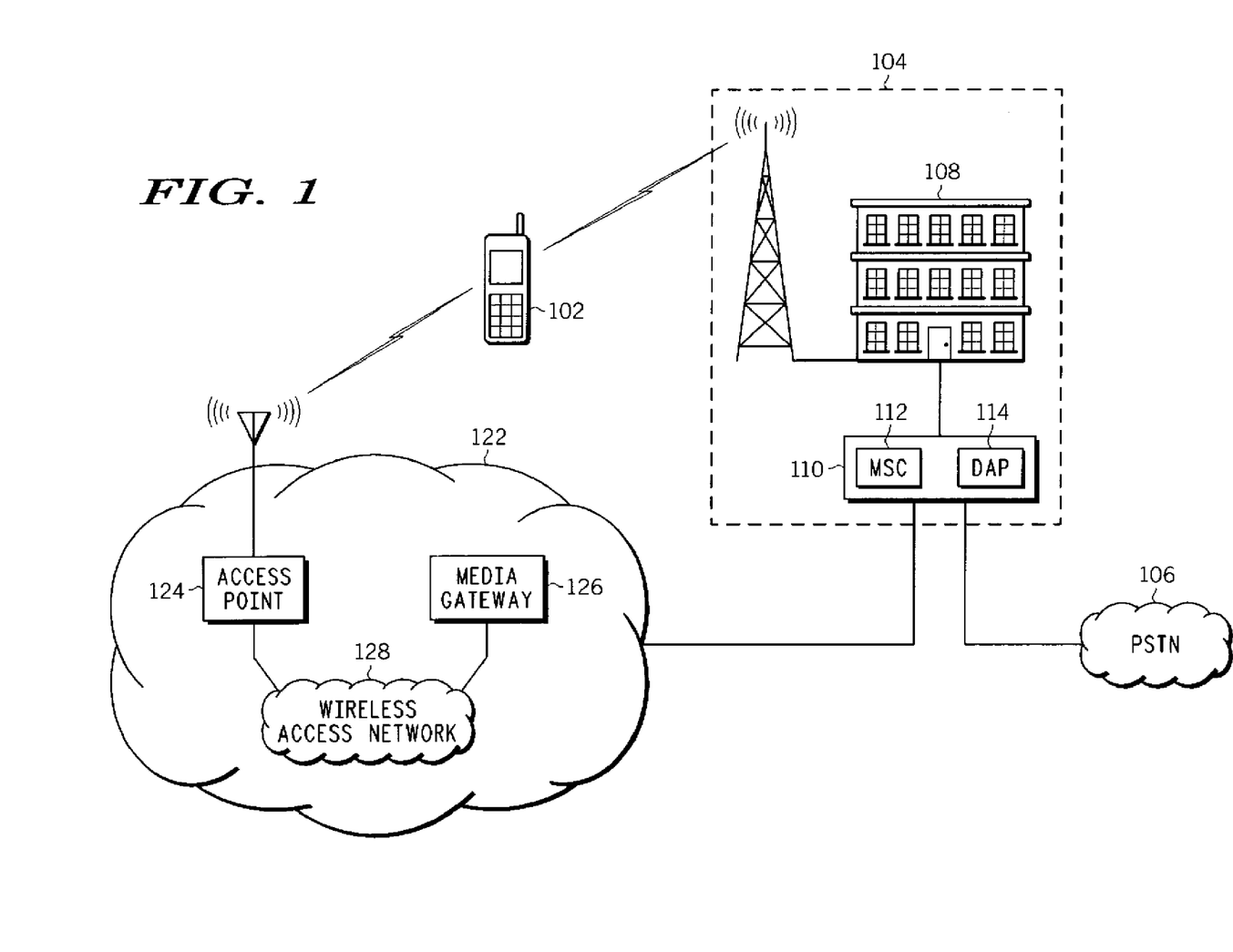
FIG. 1 is a block diagram of a representational wireless communication network.

The following drawings will be helpful in understanding the present invention. Turning now to FIG. 1, a diagram of one embodiment of the present invention is shown where communication is available using a WLAN. In FIG. 1, there is shown a wireless device, or "subscriber unit" 102. The subscriber unit 102 is able to communicate with a communication system infrastructure 104 to link to other subscriber units. The communication system infrastructure 104 includes one or more base stations 108 which establish service areas in the vicinity of the base station 108 to support wireless mobile communication, as is known in the art.

The base station 108 communicates with a central office 110 which includes call processing equipment for facilitating communication among subscriber units and between subscriber units and parties outside the communication system infrastructure, such as a mobile switching center 112 for processing mobile telephony calls, and a dispatch application processor 114 for processing dispatch or half duplex communication.

The central office 110 is further operably connected to a Public Switched Telephone Network (PSTN) 106 to connect calls between the subscriber units within the communication system infrastructure and telephone equipment outside the system. Furthermore, the central office 110 provides connectivity to a WLAN 122.

The WLAN 122 is a non-carrier network and includes a plurality of access points (APs) 124, a media gateway 126, and a wireless access network 128, that may alternatively be referred to as Private Branch Exchange (PBX), enterprise server, media gateway controller (MGC), and so on.

An AP 124, in a typical IEEE 802.11 implementation, is a station or device which provides wireless access for devices to establish a wireless connection with a LAN, and establishes a part of a WLAN 122. If the AP 124 is a fixed device on a WLAN 122, the AP 124 is a station that transmits and receives data. The AP 124 permits connection of a subscriber unit 102 to a network 128, provided that the WLAN 122 itself has a connection to the network 128. The wireless access network 128 allows communication between the access points 124 and the media gateway 126. The network shown in FIG. 1 is exemplary only and is not meant to be an exhaustive list of networks to which the present invention can be applied.

Subscriber Unit

Figure 2:
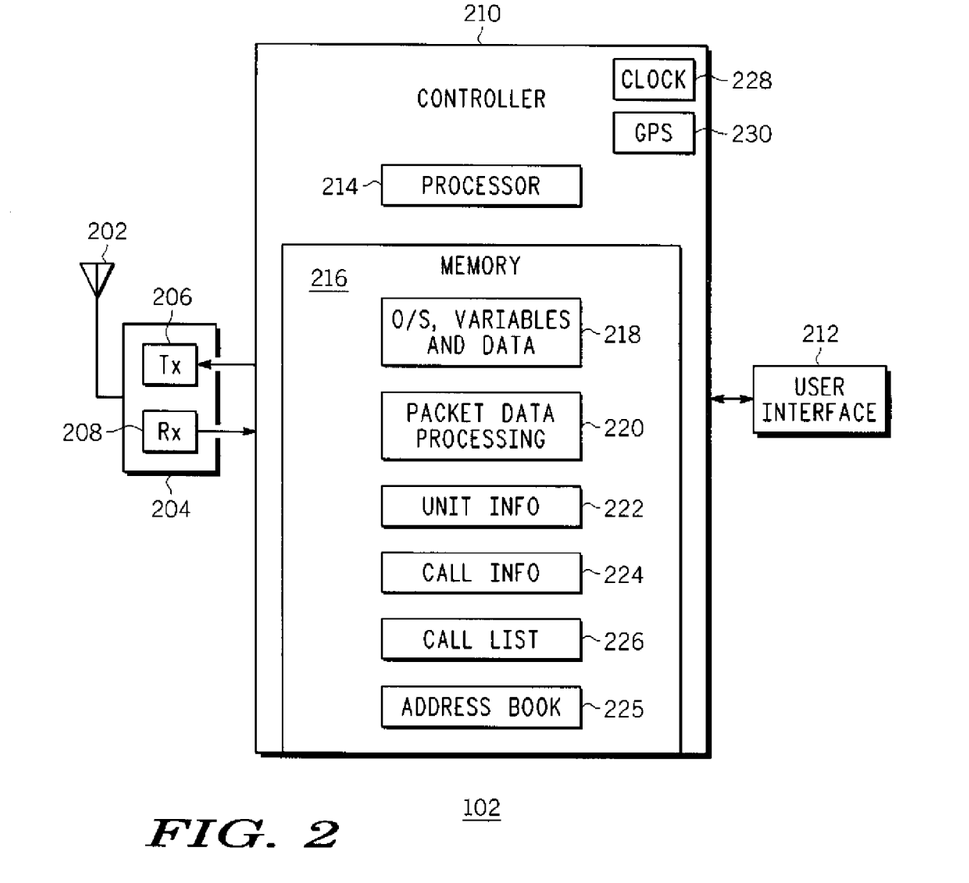
FIG. 2 is a block diagram of a wireless communication device.

Referring now to FIG. 2, a simplified block diagram of the wireless communication unit 102, which is capable of facilitating ongoing communication with a communication network, is shown. The communication unit 102 is generally known, thus the known functions and structure of such devices will not be described in detail other than as related to the inventive principles and concepts disclosed and discussed below. The communication unit 102 includes an antenna 202 or antenna structure that operates as both an input and an output to couple radio frequency signals between a transceiver 204 and a network 122 (not shown in this figure). For example, radio signals that are transmitted from a WLAN 122 are absorbed by the antenna 202 and coupled to a receiver 208 that is part of the transceiver 204. Signals broadcast by the wireless communication unit 102 are fed to the antenna 202 by a transmitter 206 that is part of the transceiver 204.

The transceiver 204 can be configurable to support simultaneous air interfaces with multiple communication networks according to the conventions and protocols of each. The transceiver 204, or receiver 208 and transmitter 206, is inter coupled as depicted and interactively operates with and is controlled by a controller 210 to transmit to or receive from, the controller 210, voice traffic or data messages or signals corresponding thereto such as in packet data form.

The communication unit 102 is capable of registering with and obtaining service from one or more communication networks. The controller can operate to determine whether the wireless device is within coverage or outside the coverage of a particular wireless network in many different ways, as should be obvious to those of ordinary skill in the art in view of the present discussion. For example, and without limitation, some transceivers use a received signal strength indication (RSSI) signal to indicate whether the wireless device is in coverage of a wireless network. Other equivalent forms of determination of in-network or outside-of-network coverage for the wireless device should be obvious to those of ordinary skill in the art in view of the present discussion.

The controller 210 is coupled to and generally operates in a known manner with a user interface 212. The user interface 212 is known and typically includes, for example, audio transducers, such as an earphone or speaker and a microphone, a display, and a keypad.

The controller 210 is essentially a general-purpose processor and, preferably, includes a processor 214 and an associated memory 216. The processor 214 can be a known processor based element with functionality that will depend on the specifics of the air interfaces with the networks in communication, as well as various network protocols for voice and data traffic. The processor 214 will operate to encode and decode voice and data messages to provide signals suitable for the transceiver or further processing by the controller 210. The processor 214 may include one or more generally available microprocessors, digital signal processors, and other integrated circuits depending on the responsibilities of the controller 210 with respect to signal processing duties or other unit features that are not relevant here.

In any event, the controller 210 also includes the memory 216 that may be, for example, a combination of known RAM (Random Access Memory), ROM (Read-Only Memory), EEPROM (Electrically Erasable Programmable ROM) or magnetic memory. The memory 216 is used to store among various other items or programs etc., an operating system or software and data 218, such as a caller list, for execution or use by the processor 214. This operating software 218 when executed by the processor 214 will result in the processor performing the requisite functions of the communication unit 102 such as interfacing with the user interface 212 and transceiver 204 or with other transmitting and receiving devices. The operating software 218, when executed by the processor 214, can also, as will be explained in detail below, cause the communication unit 102 to follow process steps that prevent the communication unit 102 from co-existing on channels containing radar activity.

The memory 216 further includes call processing routines not specifically shown for supporting voice and data calls that will be appreciated by one of ordinary skill and that will vary depending on an air interface, call processing, and service provider or network specifics.

Additionally, packet data processes 220 are provided for formulating appropriate packets for transport according to the specifics of the communication networks. Furthermore various data is provided in the memory 216, specifically unit information 222 including identification information to identity the communication unit 102 and call information 224. Collectively this information can be used to identify a particular unit and a particular call.

A further memory location 226 is used to store device, system, or user specified information. One example of such information is a call list, which stores call history, such as outgoing and inbound call numbers. An address book 225 can also be included in memory and is used to facilitate communication to other devices within the network or within other networks. This information can also be stored in other locations in memory 216 or other memories that are a part of the wireless device 102 or are external to the wireless device 102.

In addition, the device 102 has a clock 228 for determining a time of day and elapsed time. The clock 228 can be used in conjunction with memory 216 to provide a calendar for the device for tracking and differentiating days, months, and years. The device 102 can also be equipped with a location-determining device 230, such as a GPS.

Scanning

The IEEE 802.11 communications protocol allows a subscriber device 102 to roam among multiple APs 124 that may be operating on the same or separate channels. APs 124 serve as the master timing source for the WLAN 122. Each WLAN 122 associated with the AP 124 must synchronize to that AP's timer. To facilitate synchronization, APs 124 broadcast beacon signals, or simply beacons. Beacons contain information about the state of the AP's timer so that subscriber units 102 can adjust their own timers to run in synchronization with the AP 124. Being in synchronization allows the subscriber units 102 to place portions of their circuitry into a low power or sleep state, and wake up in time to receive information from the access point 124 at periodic intervals, if necessary. Beacons also allow subscriber units 102 to determine the quality of the signal received from the access point 124, and compare it with neighboring access points to determine if a change in association is necessary.

To establish a connection between a subscriber unit 102 and an AP 124 on a WLAN 122, the AP 124 transmits periodic beacons or probe responses when solicited by subscriber unit 102 and subscriber unit 102 performs either a passive and/or active scan. In active scan mode, the AP 124 transmits the beacon or probe response with a broadcast service station identifier (SSID). The transmitting subscriber unit 102 then generates a beacon report, which contains one information element for each AP from which it detects a beacon or probe response, regardless of whether the response was triggered by the transmitting subscriber unit's 102 own request.

In passive scan mode, the subscriber unit 102 does not transmit requests, but instead, passively receives information, including beacon signals, over a specified channel. Each AP 124 transmits a beacon signal at regular intervals, e.g., every 100 ms. The subscriber unit 102 creates a beacon report containing one information element for each AP 124 from which it detects a beacon response.

The roaming subscriber unit 102 uses the beacon or probe response to gauge the strength of its existing AP connection, if one exists. If the subscriber unit 102 senses a weak signal, the roaming subscriber unit 102 can implement a reassociation service to connect to an AP 124 emitting a stronger signal.

In accordance with embodiments of the present invention, communication links with APs are sought while operation on any channel containing radar signals is avoided through use of an organized operation within two main modes: "foreground scan" and "background scan"

Foreground Scan

A foreground scan can be either a passive or an active scan, but is generally performed before an AP 124 has been selected by the subscriber unit 102, or is performed after connection to an AP 124 has been lost. The foreground scan allows the subscriber device 102 to sample channels and detect radar activity before transmitting any possibly interfering signals on that channel.

Figure 3:
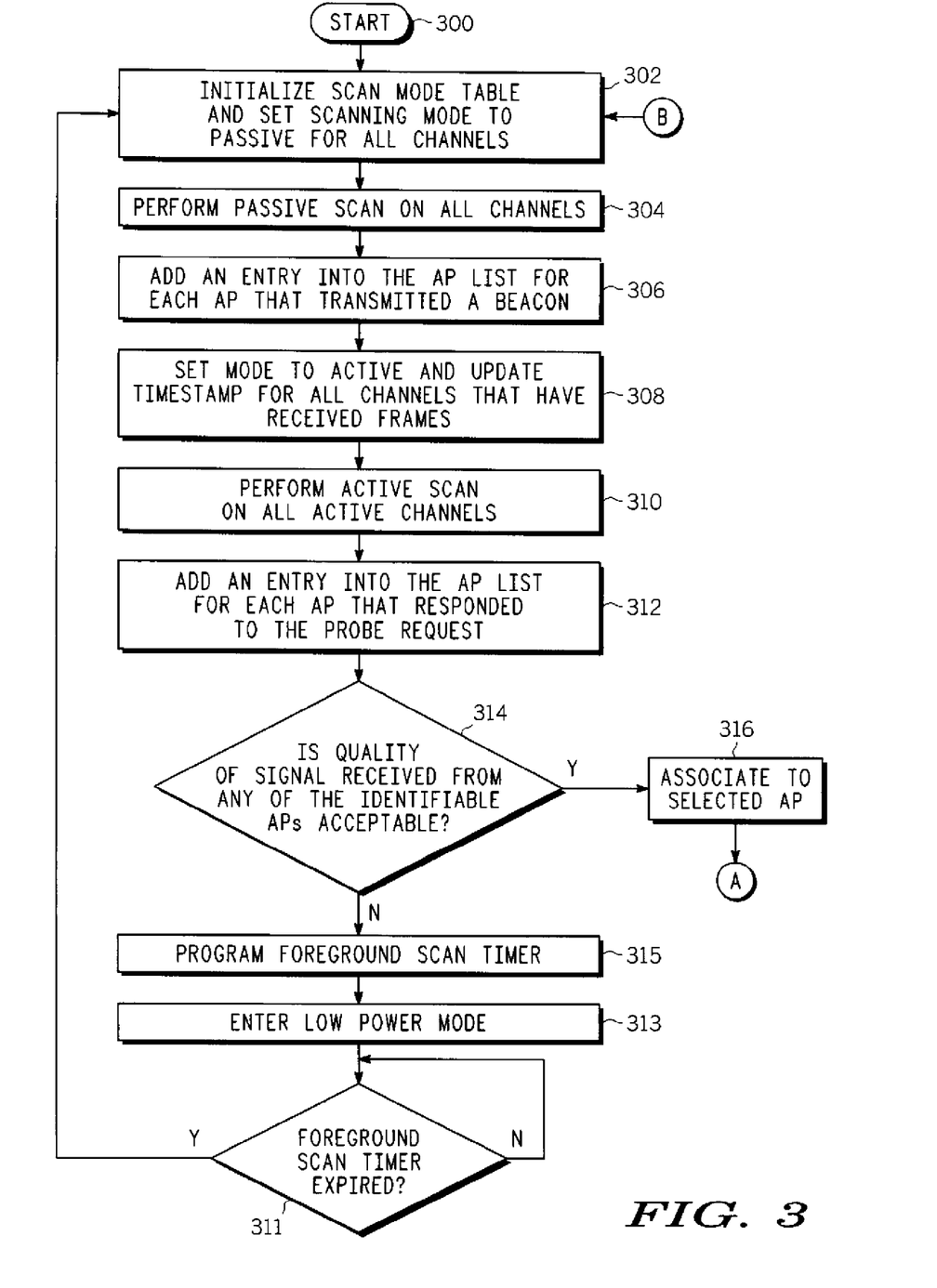
FIG. 3 is a flow diagram of a first portion of a process for avoiding co-channel operation with a radar system, according to an embodiment of the present invention.
Figure 4:
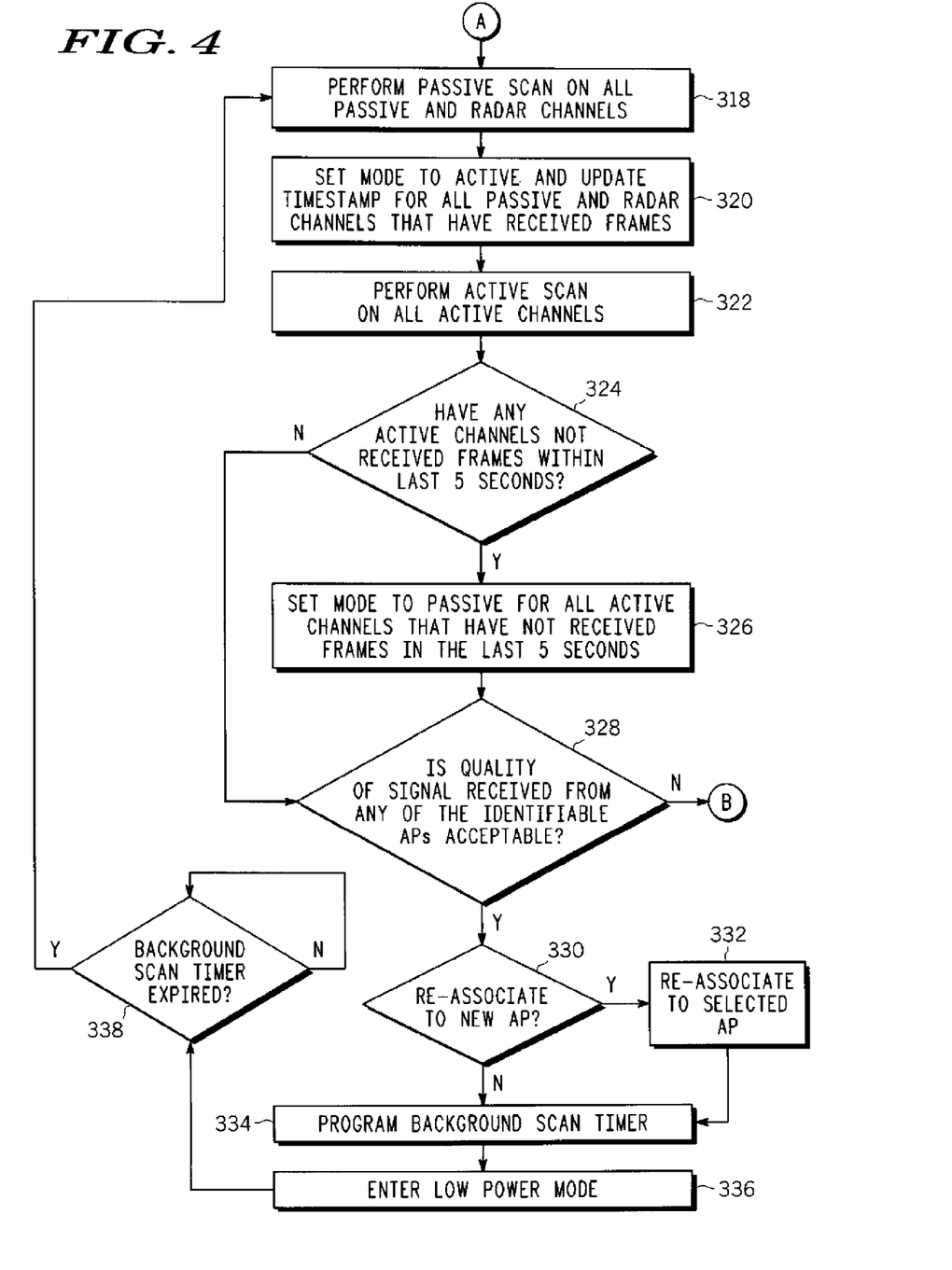
FIG. 4 is a flow diagram of a second portion of a process for avoiding co-channel operation with a radar system, according to an embodiment of the present invention.

FIGS. 3 and 4 show a process flow of acquiring a communication link with an AP 124 utilizing a foreground scan. The flow begins at step 300 of FIG. 3 and moves directly to step 302 where a scan mode table is initialized. The scan mode table tracks whether a PASSIVE or ACTIVE scan can be performed on a given channel, as well as the last time a frame was received on that channel. The scan mode table also tracks if an AP 124 has detected RADAR activity.

Also in step 302, the scanning mode of the subscriber device 102 is set to passive for all channels. In one embodiment, 11 channels will be scanned for the presence of AP connectivity, but the invention is not limited to any number of channels.

Next, in step 304, the subscriber device 102 performs a passive scan on all channels. Again, when in passive scan mode, the device 102 does not broadcast, but instead listens for beacons from all APs within communication range. Passive scanning ensures that the subscriber device 102 does not broadcast radar-interfering signals over the current channel.

The subscriber device 102, while in passive mode—and also in active mode—is able to infer that there is RADAR activity on a given channel by listening for a Channel Switch Announcement Information Element (IE). So that the subscriber device 102 is sure to avoid operation on a channel containing radar signals, in one embodiment of the present invention, radar activity is always assumed present until proven otherwise. Following this principle, if no AP 124 beacons are received on a particular channel, it is assumed that the AP 124 is not operating on that channel because radar is present. Alternatively, if an AP 124 is in operation on a particular channel, the probability of radar activity being present is greatly reduced. This is because each AP 124 is required to perform its own radar activity scanning and cease operation on any channels that such activity is determined to be present on. Of course, neither of the two assumptions is necessarily true; the lack of detected AP activity can be attributable to many factors other than the presence of radar and an AP 124 may be in operation even though a radar system is operating on that channel. Therefore, just because an AP 124 is operating, the present invention does not positively assume that no radar activity is present. As will be explained below, the present invention provides other safeguards to avoid co-channel operation with radar systems.

In step 306, the scan mode table is updated and an entry is added to the AP list for each AP that transmitted a beacon. The table entry will contain a channel identifier and an AP identifier, known as a Basic Service Set Identifier (BSSID). As stated above, each channel with an active beacon-transmitting AP 124 is assumed to be a channel with a low probability of co-channel radar activity. Therefore, the process moves to step 308, where, for each channel that received a beacon in the passive mode—indicating that an AP is actively present on that channel—the scan mode is set to active. At the time the mode switches from passive to active for that channel, a timestamp is recorded in the table. The timestamp is used with embodiments of the present invention to determine when an active-mode channel should return to passive mode. In one embodiment, a channel will remain active only if it has received frames in, for instance, the past five seconds. Other time intervals may also be used. This use of timestamps is a safety mechanism that helps ensure that a subscriber device 102 will not keep transmitting if its AP 124 has shut down for some reason, which is assumed by the present invention to be caused by detection of radar activity.

In step 310, the subscriber unit 102 performs an active scan on all channels that have been placed into the active mode. The active scan transmits a probe request to one or more APs and listens for a probe response. If a probe response is received, in step 312, an entry is added to the AP list identifying the responding AP. Because communication links are not reliable when signal strength is low, a determination is made in step 314 as to whether the quality of the signal received from each of the identified APs is acceptable. This can be performed with an RSSI. If signal strength is low, meaning there are no suitable APs to connect to, the flow moves to step 315, where the foreground scan timer is set, for example, to 30 seconds. In step 313, the device enters a low-power mode and flow moves to step 311, where it waits for the timer to expire. Once the timer expires, the flow moves back to step 302 and the process starts over, where all channels are again scanned in the passive mode. Alternatively, if at least one of the identified APs has suitable signal quality, the flow moves down to step 316 where a communication link is established between the subscriber device 102 and the selected AP 124.

Background Scan

A "background scan," as defined herein, is either an active or passive scan that is performed after an AP 124 has been selected. Since an AP 124 was selected in step 316, the flow is now able to move to the inventive background scan mode, which begins at step 318 of FIG. 4. The background scan mode begins by performing a passive scan on all passive channels and on all channels that have been identified in any of the previous steps as containing radar activity. This scan is performed to identify any channels that APs have begun transmitting on. As stated above, the presence of AP activity indicates a probability that radar activity is not present. The process of passively scanning avoids unintended subscriber device transmission on these channels, which could potentially cause interference with radar transmissions.

If any frames are received from APs 124 during the passive scan of step 318, in step 320 the scan mode for that channel is set to active and a timestamp is recorded for the channel. An active scan is then performed in step 322 on those channels. Active scanning sets up a communication protocol between a subscriber device and an AP 124. As long as frames are being received from the AP 124, it is relatively unlikely that a radar system is operating on this channel.

In step 324, a determination is made as to the amount of elapsed time since frames were received from an AP 124 on each of the channels that were set to active mode. A lack of response from an AP 124 for a predefined amount of time can be assumed, according to an embodiment of the present invention, as an indication that the AP 124 ceased operating on that channel because it detected radar activity. Therefore, if frames have not been received within a predefined amount of time (e.g., 5 seconds), the flow moves to step 326 where the mode is set to passive for those channels to avoid active transmission on a potential radar channel. In step 328, a check is performed to determine whether the quality of the signal received from any of the identifiable APs 124 is acceptable. By "identifiable," it is meant that one of the active APs 124 is transmitting. If none of the APs 124 sends a signal with sufficient quality, the flow moves back up to step 302 and the process starts over, where all channels are again scanned in the passive mode. Alternatively, if a signal of sufficient strength is received from at least one of the APs 124, the flow moves to step 330 where it is determined whether the device 102 needs to re-associate with that new AP 124. This will be the case during hand-overs or roaming. If a re-association is necessary, the flow moves to step 332 and the device 102 re-associates with an appropriate AP 124. If no re-association is necessary, the flow moves to step 334, where the background scan timer is set for example, to 1 second. In step 336, the device enters a low-power mode and the flow moves to step 338, where it waits for the timer to expire. Once the timer expires, the flow moves back to step 318 and the background process starts over again.

Figure 5:
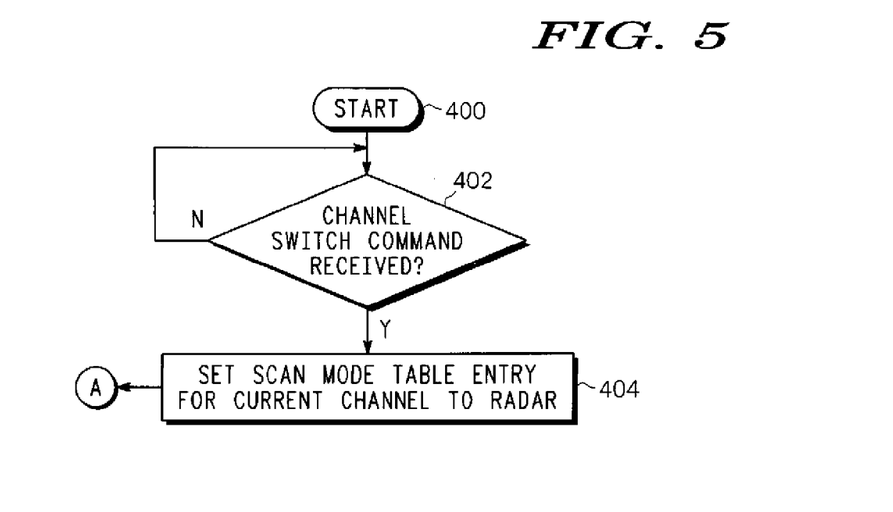
FIG. 5 is a process flow diagram of a wireless communication device receiving a channel switch command, according to an embodiment of the present invention.

FIG. 5 shows a process that is, in one embodiment of the present invention, occurring through each of the steps in the background scan portion of the process flow shown in FIG. 4 and, therefore, is shown as its own process in FIG. 5. If at any time during connection between an AP 124 and a subscriber unit 102, the AP 124 issues a channel switch command to the subscriber unit 102, the scan mode of that channel will be set to passive and the scan mode table will reflect radar. Therefore, the flow of FIG. 5 starts at step 400 and moves directly to step 402, where a determination is made as to whether a channel switch command has been received. If a channel switch command has been received, the flow moves to step 404, where the scan mode table of the current channel is set to radar. The flow then moves to step 318 of FIG. 4. If a channel switch command has not been received, the flow from step 402 loops back to itself where it waits for such a command.

Computer Program Product

In addition to the memory 216 in the user device 102, instructions for carrying out the process shown in FIGS. 3*a*, 3*b* and 4 may also be embedded in a computer program product, or computer readable medium, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

The computer readable medium may include non-volatile memory, such as ROM, flash memory, disk drive memory, CD-ROM, SIM card, and other permanent storage. Additionally, a computer medium may include, for example, volatile storage such as RAM, buffers, cache memory, and network circuits.

The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

CONCLUSION

As should now be clear, embodiments of the present invention provide an advantage over prior art devices by providing a system and device that constantly and automatically sample channels for radar activity and avoids or discontinues communication on any channels that contain such activity.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for preventing co-channel operation with a radar system, the method comprising:
setting a state of a first communication channel to active;
connecting to a first wireless access point on the first communication channel;
passively scanning at least a second communication channel for communication from a second wireless access point;
setting a state of the second channel to active if frames are received on the second channel;
determining whether an elapsed time since frames were received on at least one of the first channel and the second channel has exceed a predefined value; and
in response to the predefined value being exceeded for at least one of the first channel and the second channel, setting the state of a corresponding one of the first channel and the second channel to passive.

2. The method according to claim 1, further comprising:
determining whether a signal quality value of at least one of the first wireless access point and the second wireless access point exceeds a predetermined minimum value; and
setting all communication modes to passive in response to determining that the signal quality value of the at least one of the first wireless access point and the second wireless access point does not exceed the predetermined minimum value.

3. The method according to claim 2, further comprising:
entering a low-power sleep mode for a predetermined amount of time in response to the signal quality not exceeding the predetermined minimum value; and
upon expiration of the predetermined amount of time, passively scanning at least a third communication channel for communication from the second wireless access point.

4. The method according to claim 1, further comprising:
in response to the predefined value not being exceeded for at least one of the first channel and the second channel, determining whether a signal quality value exceeds a predetermined minimum value.

5. The method according to claim 1, further comprising:
assigning a timestamp value in response to setting the state of the second channel to active.

6. The method according to claim 5, wherein the elapsed time comprises:
a difference between a current time value and the timestamp value.

7. A device for preventing co-channel operation with a radar system, the device comprising:
a timer;
a transceiver operable to communicate on a plurality of channels to a plurality of access points; and
a processor communicatively coupled to the transceiver and to the timer, the processor operable to:
set a state of a first communication channel to active;
connect with the transceiver to a first wireless access point on the first communication channel;
passively scan with the transceiver at least a second communication channel for communication from a second wireless access point;
set a state of the second channel to active if frames are received on the second channel;
determine with the timer whether an elapsed time since frames were received on at least one of the first channel and the second channel has exceed a predefined value; and
in response to the predefined value being exceeded for at least one of the first channel and the second channel, setting the state of a corresponding one of the first channel and the second channel to passive.

8. The device according to claim 7, wherein the processor is further operable to:
determine whether a signal quality value exceeds a predetermined minimum value in response to the predefined value not being exceeded for at least one of the first channel and the second channel.

9. The device according to claim 8, wherein the processor is further operable to:
   enter a low-power sleep mode for a predetermined amount of time; and
   passively scan at least a third communication channel for communication from a second wireless access point upon expiration of the predetermined amount of time.

10. The device according to claim 7, wherein the processor is further operable to:
    assign a timestamp value in response to setting the state of the second channel to active.

11. The device according to claim 10, wherein the elapsed time comprises:
    a difference between a current time value and the timestamp value.

12. A method for preventing co-channel operation with a radar system, the method comprising:
    identifying at least one channel as one of a passive channel and a radar channel;
    performing a passive scan on the identified channels;
    receiving, from a first wireless access point, a first frame on at least one of the identified channels;
    setting a state of the at least one of the identified channels to active;
    initializing a timestamp for the at least one of the identified channels;
    determining whether an elapsed time has passed since a second frame has been received on the at least one of the identified channels; and
    in response to the elapsed time being passed, setting the state of the at least one of the identified channels to passive;
    in response to the elapsed time being passed, determining whether a signal quality value exceeds a predetermined minimum value;
    the method further comprising entering a low-power sleep mode for a predetermined amount of time; and
    upon expiration of the predetermined amount of time, passively scanning at least one communication channel for communication from a second wireless access point.

13. The method according to claim 12, further comprising:
    assigning a timestamp value in response to setting a state of the at least one of the identified channels to active.

14. The method according to claim 13, wherein the elapsed time comprises:
    a difference between a current time value and the timestamp value.

* * * * *